US008170793B2

(12) United States Patent
Kaubisch

(10) Patent No.: US 8,170,793 B2
(45) Date of Patent: May 1, 2012

(54) SYSTEM AND METHOD FOR DETERMINING ROUTING POINT PLACEMENT FOR AIDING IN ENCODING AND DECODING A PATH

(75) Inventor: Elizabeth V. C. Kaubisch, Palo Alto, CA (US)

(73) Assignee: Tele Atlas North America, Inc., Lebanon, NH (US)

( * ) Notice: Subject to any disclaimer, the term of this patent is extended or adjusted under 35 U.S.C. 154(b) by 1149 days.

(21) Appl. No.: 11/772,021

(22) Filed: Jun. 29, 2007

(65) Prior Publication Data
US 2009/0005926 A1    Jan. 1, 2009

(51) Int. Cl.
*G01C 21/32* (2006.01)
(52) U.S. Cl. .............. 701/411; 340/995.12; 340/995.14
(58) Field of Classification Search .............. 701/201, 701/206, 207, 208, 209, 210, 211
See application file for complete search history.

(56) References Cited

U.S. PATENT DOCUMENTS

| | | | |
|---|---|---|---|
| 6,038,509 A * | 3/2000 | Poppen et al. ............... 701/210 |
| 6,480,783 B1 * | 11/2002 | Myr ............................ 701/117 |
| 6,484,093 B1 * | 11/2002 | Ito et al. ...................... 701/211 |
| 6,812,888 B2 * | 11/2004 | Drury et al. ............ 342/357.31 |
| 6,865,479 B2 * | 3/2005 | Chen et al. ................... 701/209 |
| 7,565,155 B2 * | 7/2009 | Sheha et al. .............. 455/456.1 |
| 2002/0052689 A1 * | 5/2002 | Yamashita et al. ........... 701/211 |
| 2005/0131632 A1 * | 6/2005 | Adachi ........................ 701/200 |
| 2006/0136123 A1 * | 6/2006 | Chinitz ........................ 701/202 |
| 2006/0217884 A1 * | 9/2006 | Adachi ........................ 701/210 |
| 2007/0118281 A1 * | 5/2007 | Adam et al. ................. 701/211 |
| 2007/0276585 A1 * | 11/2007 | Hisada et al. ................ 701/200 |
| 2011/0125396 A1 * | 5/2011 | Sheha et al. ................. 701/201 |

FOREIGN PATENT DOCUMENTS

| EP | 0679867 A1 | 11/1995 |
| EP | 0854353 A2 | 7/1998 |

OTHER PUBLICATIONS

Kovacs et al., "Cooperative Vehicle-Infrastructure Systems", Use Cases and System Requirements, Nov. 30, 2006, 118 pages.
"International Search Report and Written Opinion", Oct. 8, 2008, 8 pages.

\* cited by examiner

*Primary Examiner* — Thomas Black
*Assistant Examiner* — Sze-Hon Kong

(57) ABSTRACT

A method of encoding a shortened path definition of a path in a mapping system is described. In one embodiment, a shortened path definition includes only those routing points that are needed to eliminate valid alternate routes.

29 Claims, 10 Drawing Sheets

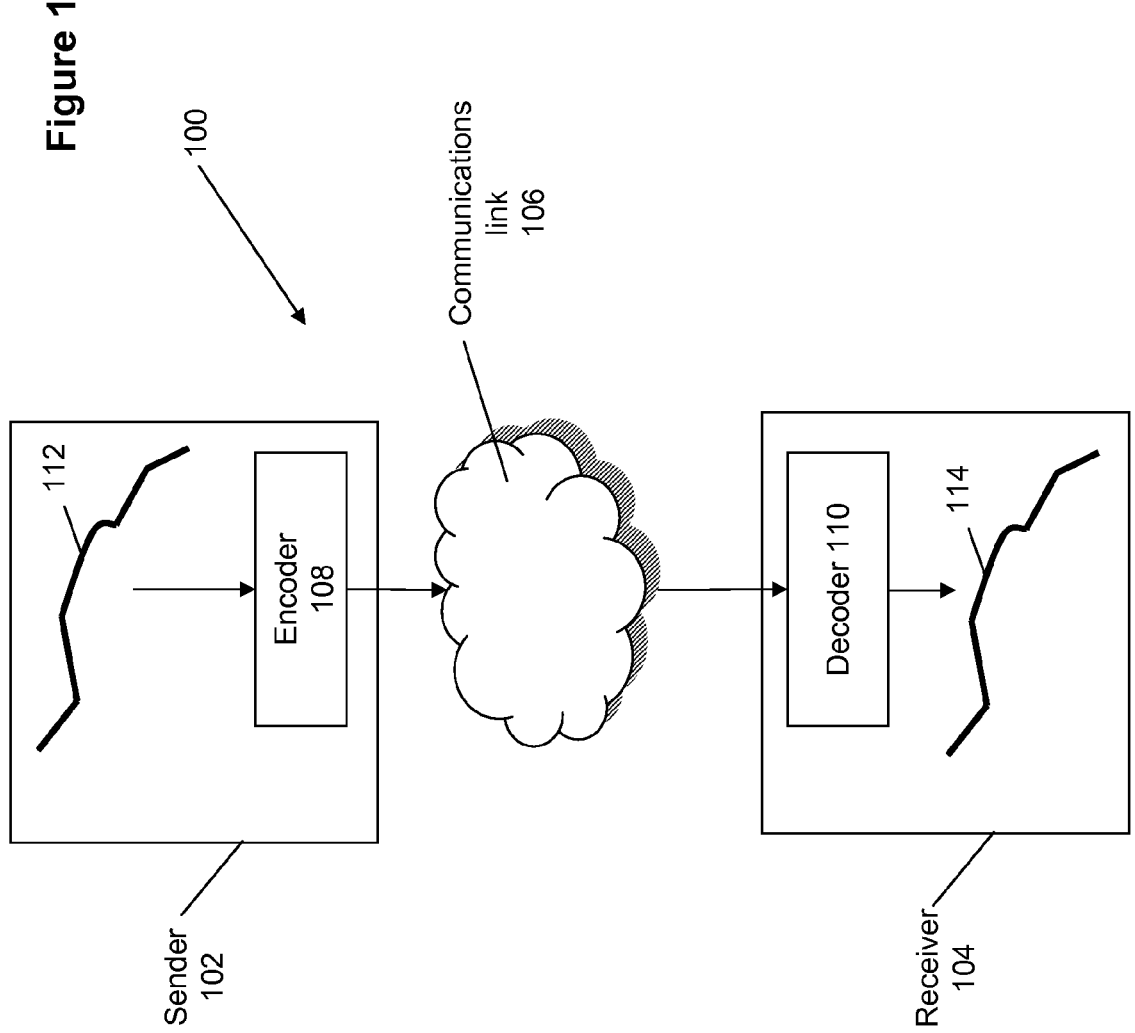

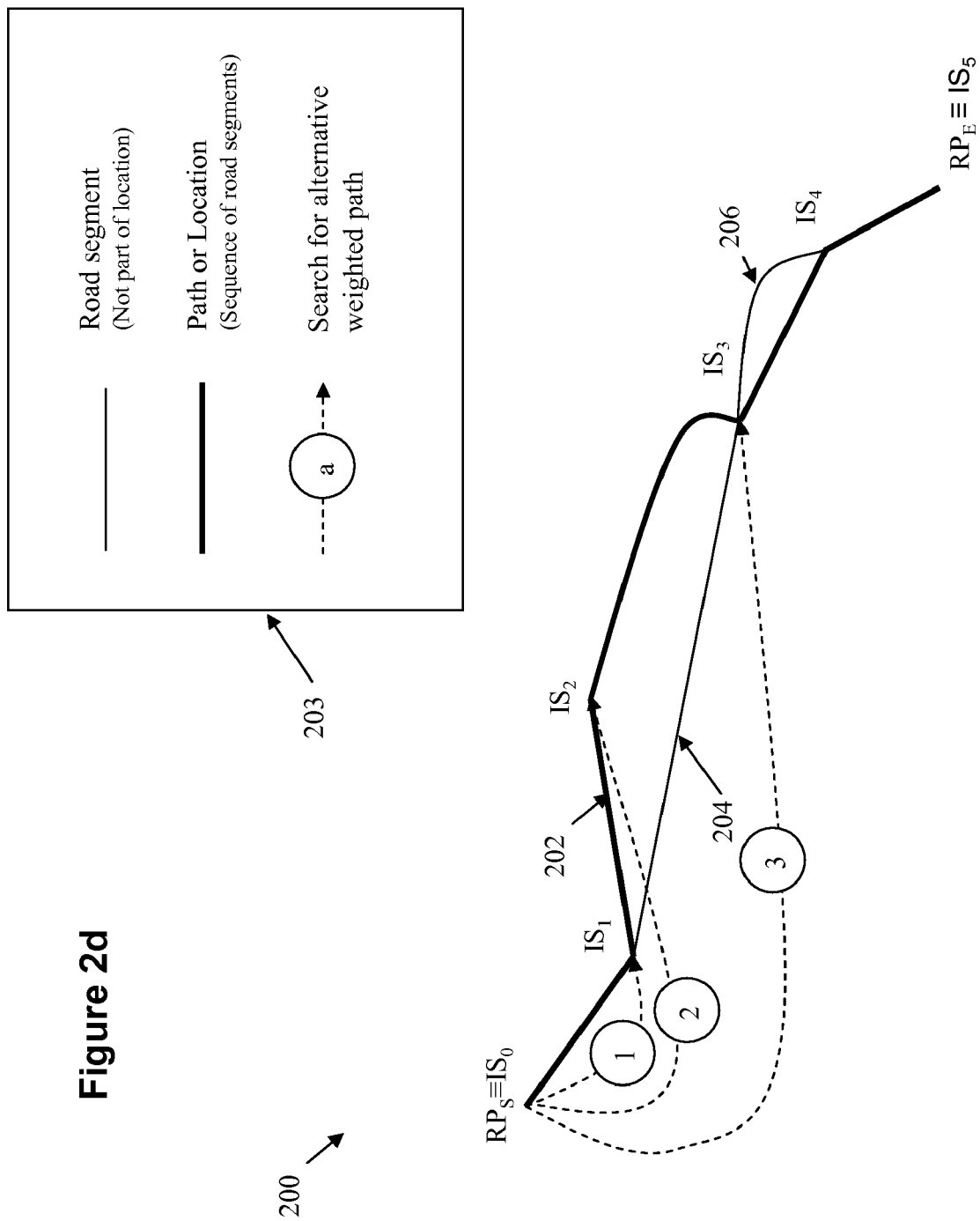

SYSTEM AND METHOD FOR DETERMINING ROUTING POINT PLACEMENT FOR AIDING IN ENCODING AND DECODING A PATH

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to electronic mapping and, more particularly, to a system and method for determining routing point placement for aiding in encoding and decoding a path.

BACKGROUND

In the world of mapping, unique identification of geographic objects is paramount.

A Location Reference (LR) is a unique identification of a geographic object. Proposed International Standard, ISO 17572 Location Referencing for Geographic Databases, describes location referencing in great detail, with Part 3 covering Dynamic Location Referencing (the AGORA-C method). Generally, in a digital world, a geographic object can be represented by a feature in a geographic database. An example of a commonly known Location Reference is a postal address of a house. Examples of object instances include a particular exit ramp on a particular motorway, a road junction or a hotel. For efficiency reasons, Location References are often coded. This is especially significant if the Location Reference is used to transmit information about various objects between different systems. For Intelligent Transportation Systems (ITS), many different types of real world objects will be addressed. Among these, Location Referencing of the road network or components thereof, is a particular focus.

Communication of a Location Reference for specific geographic phenomena, corresponding to objects in geographic databases, in a standard, unambiguous manner can be a vital part of an integrated ITS system, in which different applications and sources of geographic data will be used. Location Referencing Methods (LRM, methods of referencing object instances) differ by applications, by the data model used to create the database, or by the enforced object referencing imposed by the specific mapping system used to create and store the database. A standard Location Referencing Method allows for a common and unambiguous identification of object instances representing the same geographic phenomena in different geographic databases produced by different vendors, for varied applications, and operating on multiple hardware/software platforms. If ITS database technology is to become widespread, data reference across various applications and systems must be possible. Information prepared on one system, such as traffic messages, must be interpretable by all receiving systems. A standard method to refer to specific object instances is essential to achieving such objectives.

Presently, most systems utilize what is termed "pre-coded location references" or "pre-code profiles". In the pre-coded reference model, each system (the sending system and the receiving system) has its own pre-coded map table (or location table) with digital geographical data representing often used locations, or geographical objects, such as buildings, streets, etc. In this way, if a sender wished to reference a house, for instance, it would retrieve from its local map table the pre-coded geographical data representing the location of the, e.g., house and send the data to the receiver. The receiver would utilize the received data to retrieve from its local map table the information regarding that location it needed to perform the desired function. Pre-coded location referencing is utilized in the Radio Data System—Traffic Message Channel (RDS-TMC), a technology for delivering traffic and travel information to drivers.

The pre-coded location reference model, while having the advantage of the conciseness of the code, causes numerous problems, however. First, the map tables at the sender and the receiver need to be kept in sync so that there is no ambiguity in the location information. This is time-consuming and expensive and, many times, cannot be accomplished (such as when either the sender or the receiver has an older version of the map table) such that different map tables and data are in use concurrently causing obvious problems. Secondly, the map table of the sender may be provided by a different map table provider than the map table provided to the receiver such that the map tables are, again, different, causing the same types of problems. Finally, the pre-coded location referencing model has a limited number of addressable locations.

Consequently, pre-coded location referencing is not the preferred location referencing model; rather, dynamic location referencing is becoming the preferred standard. One example of dynamic location referencing is described in detail in the AGORA-C specification on describing "on-the-fly" location reference modeling.

Under the AGORA-C specification, encoding rules provide necessary semantics both for creating the location code at the sending system and for interpreting this code in the end terminal. Thus, the role of the encoding rules is both to provide constraints for selecting and creating the set of information elements at the sending system, and to provide a consistent interpretation basis for the receiving system to reconstruct the location reference as intended by the sending system.

Because the location code is dynamically coded at the sending end and dynamically decoded at the receiving end, a premium is placed upon limiting the amount of data needed to unambiguously identify a location. (A "location" is defined in ISO 17572 and AGORA-C and can be a series of connected road sections, where each road section is bounded by two different intersections (IS).) While some encoding schemes have been developed which conform to AGORA-C, some have been shown to be slow and not always successful.

SUMMARY OF THE INVENTION

Embodiments of the present invention concern a system and method for determining placement of routing points for aiding in unambiguously representing and reconstructing (encoding and decoding) a path, or "location". In this invention, a path is represented (encoded) using one version of a map of an area and the encoded path definition can then be used to reconstruct (decode) the path on a second map of the area, said second map being the same map, a different version of that map made by the same vendor or a different version of that map made by a different vendor.

BRIEF DESCRIPTION OF THE DRAWINGS

FIG. 1 is an illustration of a basic block diagram representing the system and method of the present invention for determining placement of routing points for aiding in unambiguously representing (encoding) a path, or "location", on a version of a sender map and reconstructing (decoding) it on another receiver map, the receiver map being possibly a different version from the sender map or possibly a map of the same area, supplied from a different vendor.

FIG. 2, which comprises FIGS. 2a-2h, illustrates the search algorithm and encoding scheme of one embodiment of the present invention.

DETAILED DESCRIPTION OF THE PREFERRED EMBODIMENT

Figure 2A:
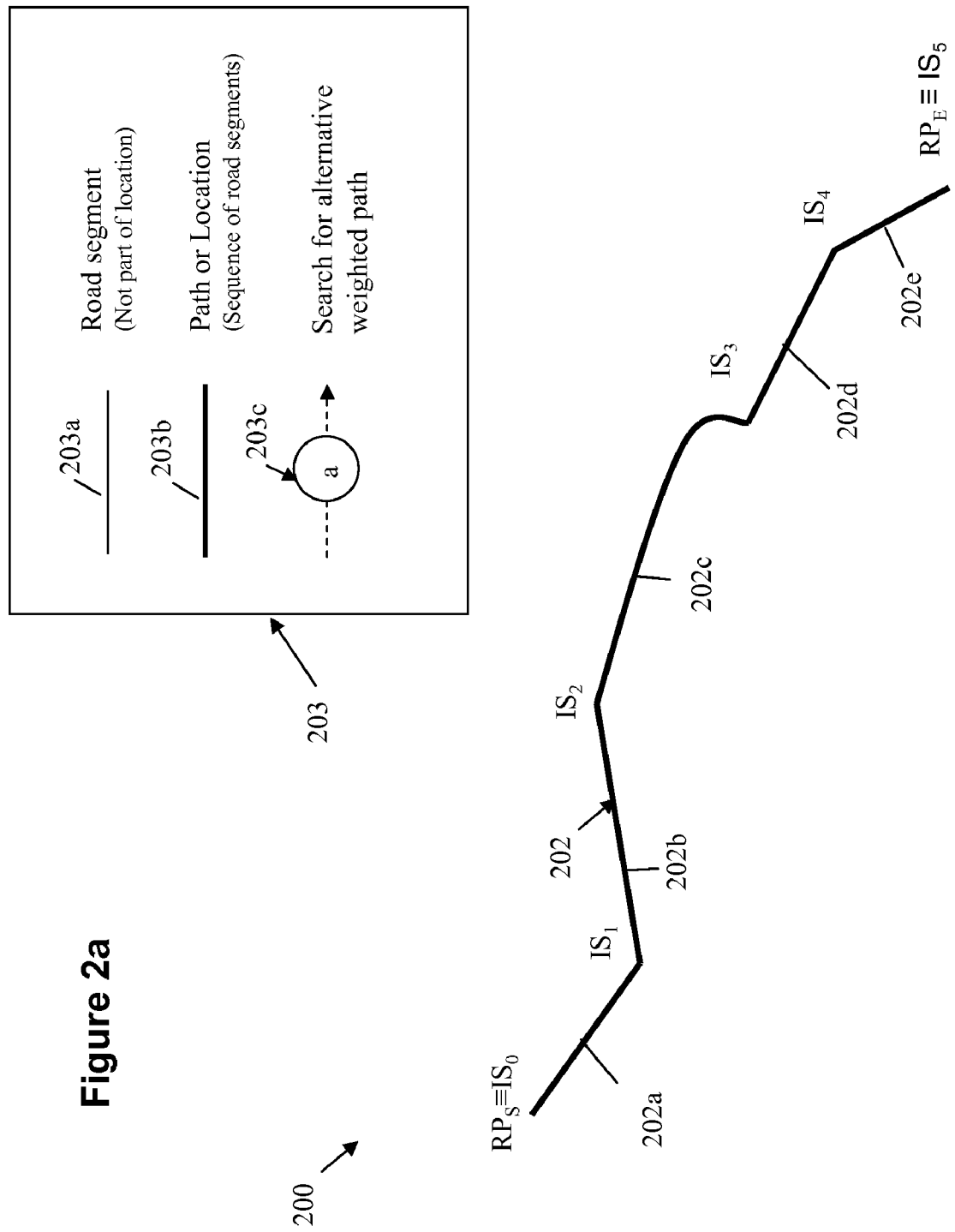

Embodiments of the present invention can concern ways to encode a path definition. Given a path consisting of a start point, a sequence of connected road segments, and an end point, an example of a path definition could be the start point, every intermediate intersection point along the path, and then the end point. The path definition can then be transferred between a sender and a receiver.

In order to conserve bandwidth, the transferred path definition can be, or can be derived from, a shortened path definition which can be smaller, and thus uses less bandwidth, than an initial path definition.

The shortened path definition need not include all of the intersection points of the initial path definition. Consider a path on a highway between two intersections (on-ramps, off-ramps). In this case, it is likely that there will be no other valid alternate paths because the highway typically will have a significantly lower routing calculation cost from the starting point to the end point than any alternate path. In this case, the shortened path definition need only include the start point and the end point.

However, this is not always the case. If there are any valid alternate paths between the starting point and the end point, then some additional points, called routing points, are needed to help constrain the decoder into decoding the correct path. Routing points partition the path into a sequence of shortest paths. Typically, the shortened path definition includes the start point, the end point and any routing points needed to eliminate valid alternate paths.

The encoder can check to see if there are any alternate valid paths between different points of a path definition. The validity of the alternate paths can be defined by a specification such as Rules 18(b) and 18(c) of AGORA-C. Alternate paths can be valid if their routing calculation costs are comparable to the routing calculation cost of the desired path. Under the AGORA-C specification, alternate paths are valid if their routing cost is less than 1.25 times the routing cost of the part of the path to be encoded that they provide an alternative to.

In one embodiment, the shortened path definition fulfills only a portion of the specification relating to routing points. The shortened path definition can then be further processed to determine the final encoded path definition to be transmitted. In the AGORA-C specification, rules such as Rule 10 and Rule 11 define additional points to be included in the transmitted path definition, such as intersections where the road signature changes (IP's), and other calculated location points, (LP's), that enable the extent of the path to be calculated.

FIG. 1 illustrates a basic block diagram representing the system and method of the present invention for determining routing point placement for aiding in unambiguously representing a path, or "location", from one version of a map and reconstructing it on another map of the same area, possibly the same map, or a different version, or from a different vendor.

The system 100 has a sender 102 and a receiver 104 which can communicate via communications link 106. The sender 102 can be one of many items such as a radio based system, a cell phone based system, a wireless data network or the like. The receiver 104 can be one of many things such as a mapping system in a mobile device such as an automobile, in a PDA, etc. The communications link 106, can be a wireless communications link from the sender to the mobile receiver. An example of this is an automobile having a receiver to receive directions or instructions from a sender for a different route due to traffic issues and the like. Sender 102 has an encoder 108 while receiver 104 has a decoder 110. Sender 102 could be a sender/receiver, having both an encoder and a decoder, as could receiver 104. The sender 102 has a path 112 comprised of a start point, a sequence of connected road segments, and an end point (to be discussed in greater detail below) which it wishes to send to receiver 104 over communications link 106.

The path 112, as represented by various data elements such as according to rules and definitions of AGORA-C, is encoded by encoder 108 using the system and method of the present invention. The encoded location is received by receiver 104 and decoded by decoder 110 resulting in received and decoded location 114 in accordance with the system and method of the present invention. The system and method can conform to a standard such as the AGORA-C rules. In one embodiment, the system can utilize a standard such as AGORA-C rules associated with routing points, intersections, and attributes to unambiguously and efficiently encode location information in a sender such that a receiver may decode the information and unambiguously and efficiently reconstruct the location (path).

One embodiment of the present invention checks sections of a path for valid alternate paths to determine whether a routing point needs to be included in the shortened path definition to adequately distinguish the path segment from alternate segments.

In one embodiment, the system iteratively checks whether there is a valid alternate path to increasingly longer sections of the path, taking into consideration any included routing points until the whole path has been tested and the process is completed. Each check can exclude the last addition to the section of the path being checked from being part of a possible alternate path. Each time a valid alternate path is found, a new routing point can be added within the last addition to the path section to eliminate the valid alternate path as a possibility and the checking continues, starting with the newly added routing point. Completing the process can define the shortened path definition as the initial starting point, the sequence of added routing points and the initial ending point.

FIG. 2A-2H illustrates the operation of one embodiment. FIG. 2a shows location 200 having a sequence of road segments 202. The sequence of road segments 202 can comprise, in this example, 5 segments $202a$, $202b$, $202c$, $202d$, and $202e$: the first segment $202a$ starting at the starting routing point $RP_S$ extending to the first intersection $IS_1$, the second segment $202b$ starting at $IS_1$ extending to the second intersection $IS_2$, the third segment $202c$ from $IS_2$ to $IS_3$, the fourth $202d$ from $IS_3$ to $IS_4$, and the fifth and last $202e$ from $IS_4$ to ending routing point $RP_E$.

Because there are often alternate paths from $RP_S$ to $RP_E$, merely transmitting these two points is not sufficient to uniquely identify the path. A naïve and costly way to indicate the path is to transmit each of the points $RP_S$, $IS_1$, $IS_2$, $IS_3$, $IS_4$, and $RP_E=IS_5$ from the sender to the receiver. Embodiments of the present invention describe a way to aid in reducing the number of points needed to uniquely transmit the path.

The example below indicates the operation with respect to the AGORA-C specification. In the present example, E (the ending routing point subscript)=S (the starting routing point subscript)+5 (the number of road segments). The legend 203 helps identify the symbols used in this figure as well as the figures following. A road segment which is not part of the location is indicated by a thin line 203a; the path itself is indicated by a thick line 203b; and a search for an alternate weighted path is indicated by a dashed line and encircled number 203c. This can more easily be seen in FIGS. 2b-2h.

Figure 3:
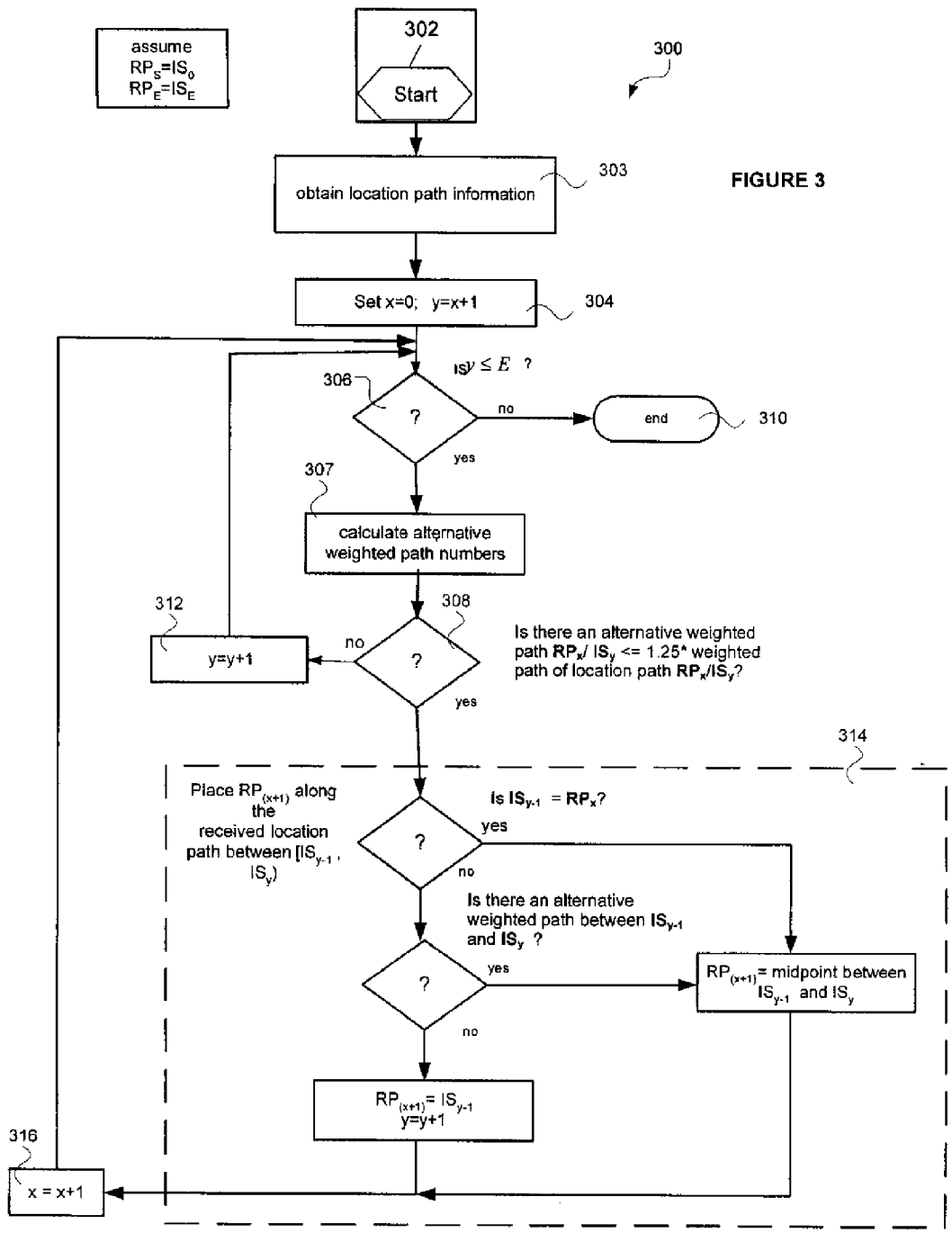
FIG. 3 illustrates, in block diagram form, the search algorithm and encoding scheme of one embodiment of the present invention.

Referring now to FIG. 3, a flowchart of one method 300 of the present invention is shown in detail. At 302, the method or process begins. At 303, the path data is obtained by the encoder 108. The path data can comprise data elements such as, road segments and intersections and their attributes. The starting routing point $RP_S$, the ending routing point $RP_{Es}$ and the intersection points ($IS_y$) can be utilized extensively, but not necessarily exclusively, in this invention. The starting routing point ($RP_S$) is at the start of the path or location. Intersection $IS_1$ is the first intersection along the Location 202 (along Location Road Path 202a). Intersection $IS_2$ is the second intersection along the Location 202 (along Location Road Path 202b) and so forth. "y" is used in this specification to designate the variable of the number of intersections along the path or location. "x" is used to designate the routing point increments, on an as needed basis. That is, $RP_S$ is the starting routing point (S=0) and $IS_y$ is the first intersection (where "y"=1). The method also denotes $RP_S$ by $IS_0$ and $RP_E$ by $IS_{n+1}$ (assuming n intersections), even if the start and end points are not at intersections, so in this example S=0 and E=5.

For the example of FIG. 2, at step 304 of FIG. 3, "x" is set to zero (0) and "y" is set to "x"+1 (1). At step 306, it is determined whether y is less than or equal to E (5 in this example). If not, the whole location has been tested and so the process ends at 310. If so, at 307, it is calculated whether there is a shorter or within range weighted path (i.e. an alternate valid path) between the start routing point ($RP_S/IS_0$) and the next intersection ($IS_1$), excluding this section of the path as a possible alternate. Weighted paths are determined by the weight factors of the road segments. Weight factors can be calculated based upon numerous factors such as road class, capacity, speed limit, etc. For instance, Rule 17 of the AGORA-C Specification states:

RULE-17 The weight factor per functional road class to be used in calculation of weighted distance for decoding purposes shall be defined as in table 5-1. The weighted distance is defined as weight factor x distance.

TABLE 5-1

Distance weight factors

| | FUNCTIONAL ROAD CLASS | | | |
|---|---|---|---|---|
| | Main roads | first class roads | second class roads | ☐ third class roads |
| WEIGHT FACTOR | 2 | 3 | 4 | 6 |

Note: The rationale for this weight factor is to allow very succinct reference codes for long highway segments, since all other non-highway segments, even when parallel to the main road, will have at least a 50% larger weighted distance.

At 308, it is determined whether there is an alternate weighted path between the current routing point, the starting routing point $RP_S/IS_0$, in this case, and the current end intersection, or the first intersection $IS_1$, in this case. If not, "y" is incremented at 312 to update the current end by moving it to the next intersection. This adds a new end segment to the section of the path currently being tested (the end segment being the path section or road segment connecting the previous end to the current end), and the process returns to 306. If so, a new routing point ($RP_{(x+1)}$) is identified. At step 314, the routing point $RP_{(X+1)}$ is added and "y" is incremented to extend the section of the path currently being tested to the next intersection. At step 316, "x" is incremented to update the current routing point and thus the start of the section of the path currently being tested and the process returns to step 306 and continues as discussed above.

At step 314, it is determined where to place the routing point. If the start intersection of the end segment of the path section being tested is already a routing point, or if there is an alternate weighted path to the end segment of the path being tested, then the routing point is placed at the mid-point of the end segment. If neither of these alternatives is true, the routing point is placed at the start intersection of the end segment.

Figure 2B:
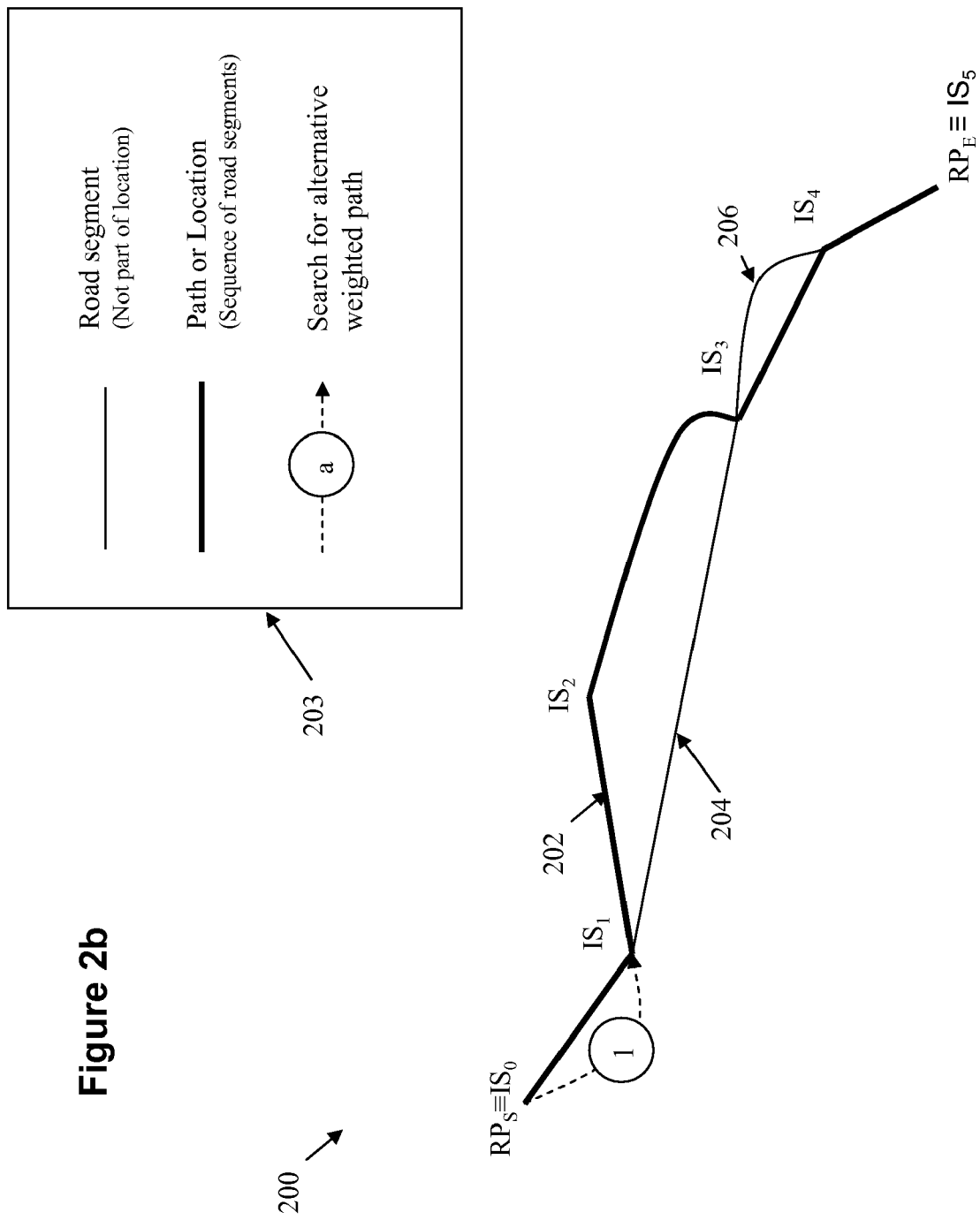

This process can be more clearly seen in FIGS. 2b-2h. Referring now to FIG. 2b, path 202 is shown. Path 202 is the thick line running from $RP_S$ to $RP_E$—that is, $RP_S \rightarrow IS_1 \rightarrow IS_2 \rightarrow IS_3 \rightarrow IS_4 \rightarrow RP_E$. Sender 102 searches (at 1) between $RP_S$ and $IS_1$, the next intersection, for an alternate weighted path. As defined by Rule 17 of AGORA-C, weight factors are used in the calculation of weighted distance. For instance a main road has a weight factor of 2, a first class road has a weight factor of 3, a second class road has a weight factor of 3, and so forth. (AGORA-C Specification 6 Apr. 2005.) The weighted distance is equal to the weight factor times the distance (WD=WF×D). An alternate weighted path is a path whose weighted distance is less than one and one quarter times (1.25*) the weighted distance of the desired path (in this case, the road segment connecting $RP_S$ and $IS_1$).

Figure 2C:
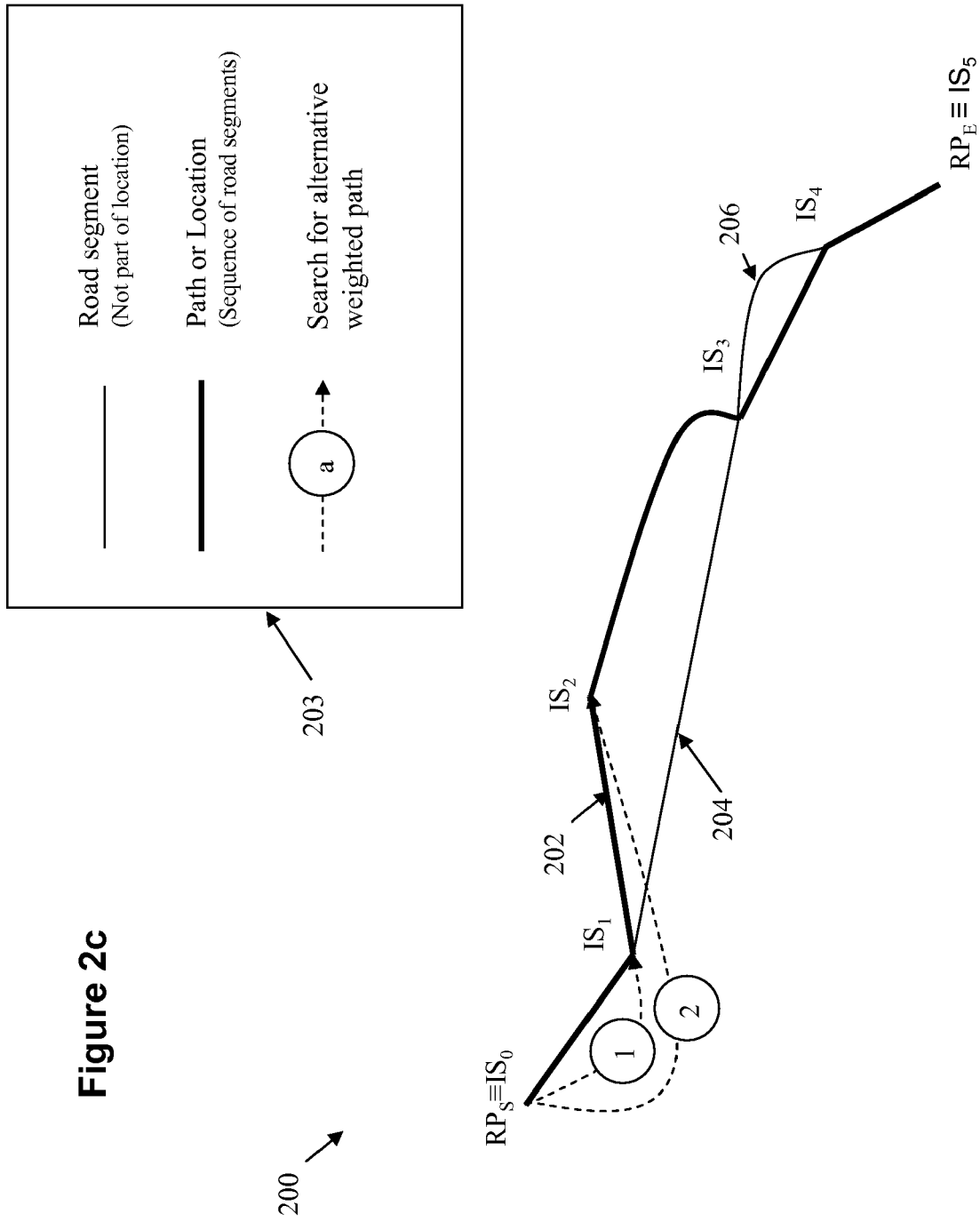
Figure 2E:
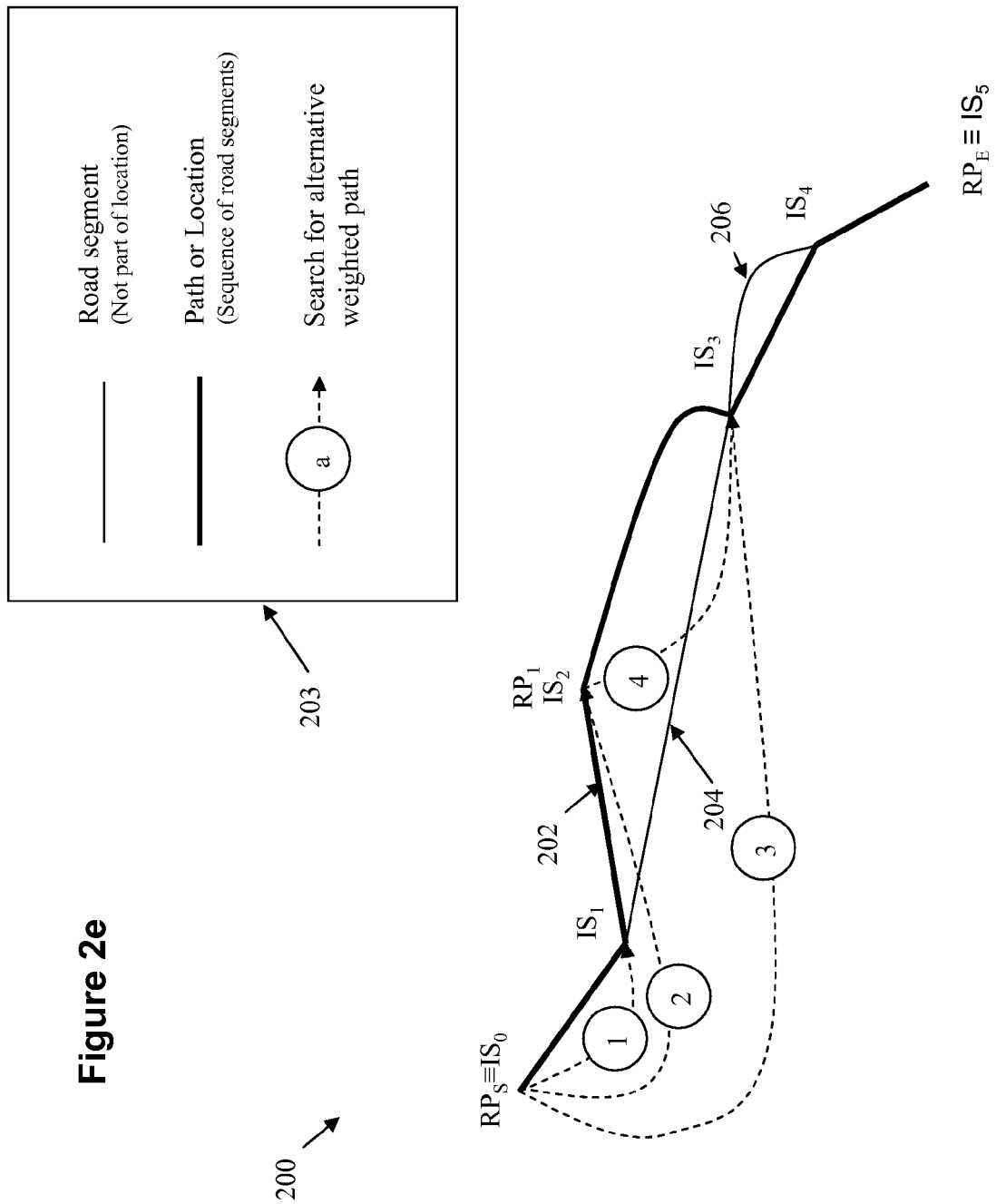

Since no alternate weighted distance is found, the encoder moves the end point of the currently tested section to the next point, $IS_2$, adding a new end segment from $IS_1$ to $IS_2$ to the currently tested section. At this point, as shown in FIG. 2c, search (2) is conducted between $RP_S$ and $IS_2$, the next intersection, for an alternate weighted path. As no alternate weighted path is found, the encoder moves the end point to the next point, $IS_3$. At this point, as shown in FIG. 2d, search (3) is conducted between $RP_S$ and $IS_3$, the next intersection, for an alternate weighted path. In this case, there is an alternate weighted path, that is, $RP_S \rightarrow IS_1 \rightarrow IS_3$ (along segment 204). Because there is an alternate weighted path ($RP_S \rightarrow IS_1 \rightarrow IS_3$ (along segment 204)) between $RP_S$ and $IS_3$ other than the desired Path (thicker line), a routing point $RP_1$ needs to be placed on the path between $IS_2$ and $IS_3$. Next, as shown in FIG. 2e, to determine where to place the routing point on this end segment of the currently tested path, the encoder conducts search (4) between $IS_2$ and the next intersection, $IS_3$, for an alternate weighted path. Because no alternate weighted path was found and because $IS_2$ is not already a routing point, $RP_1$ is placed at $IS_2$.

Figure 2F:
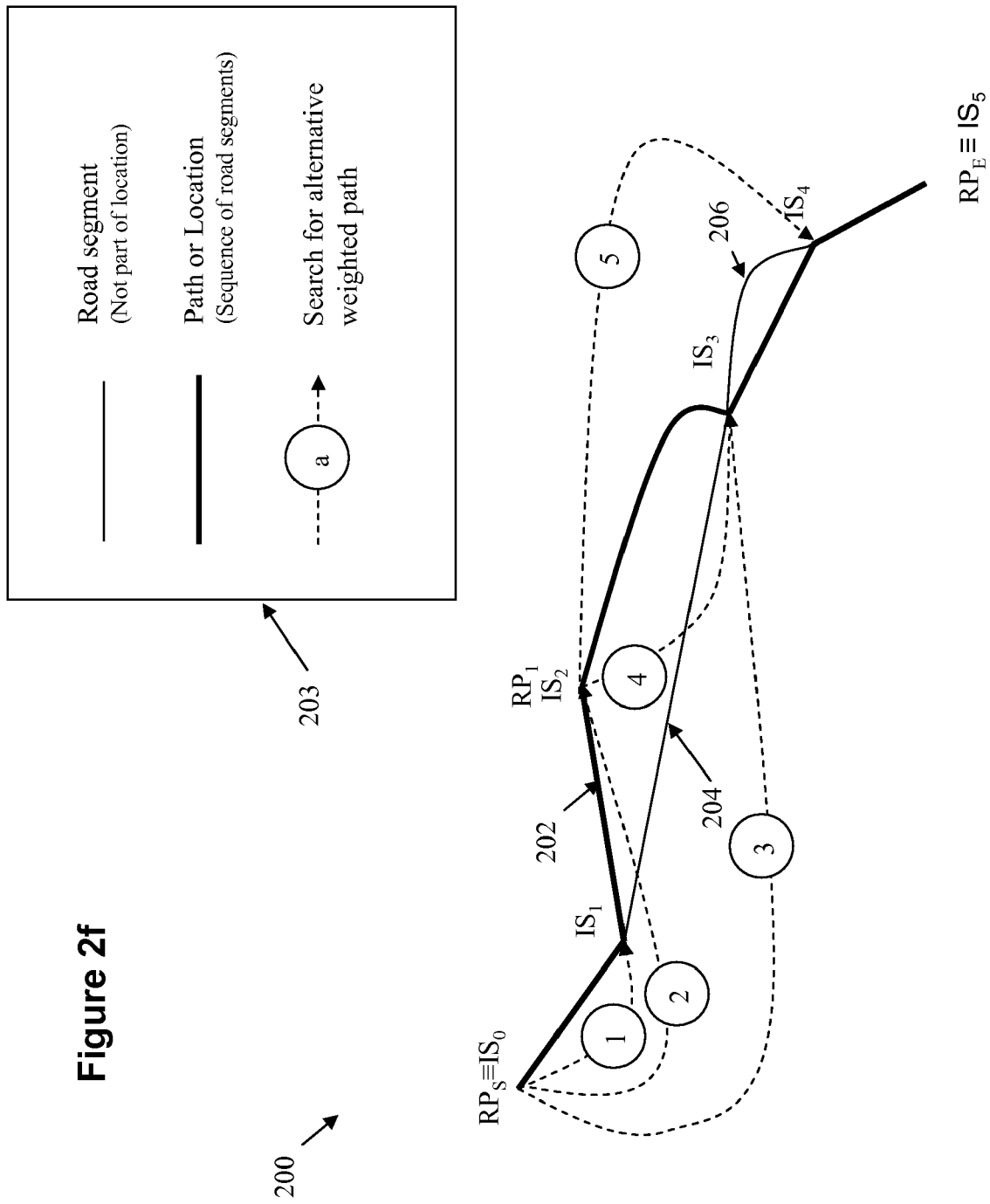
Figure 2G:
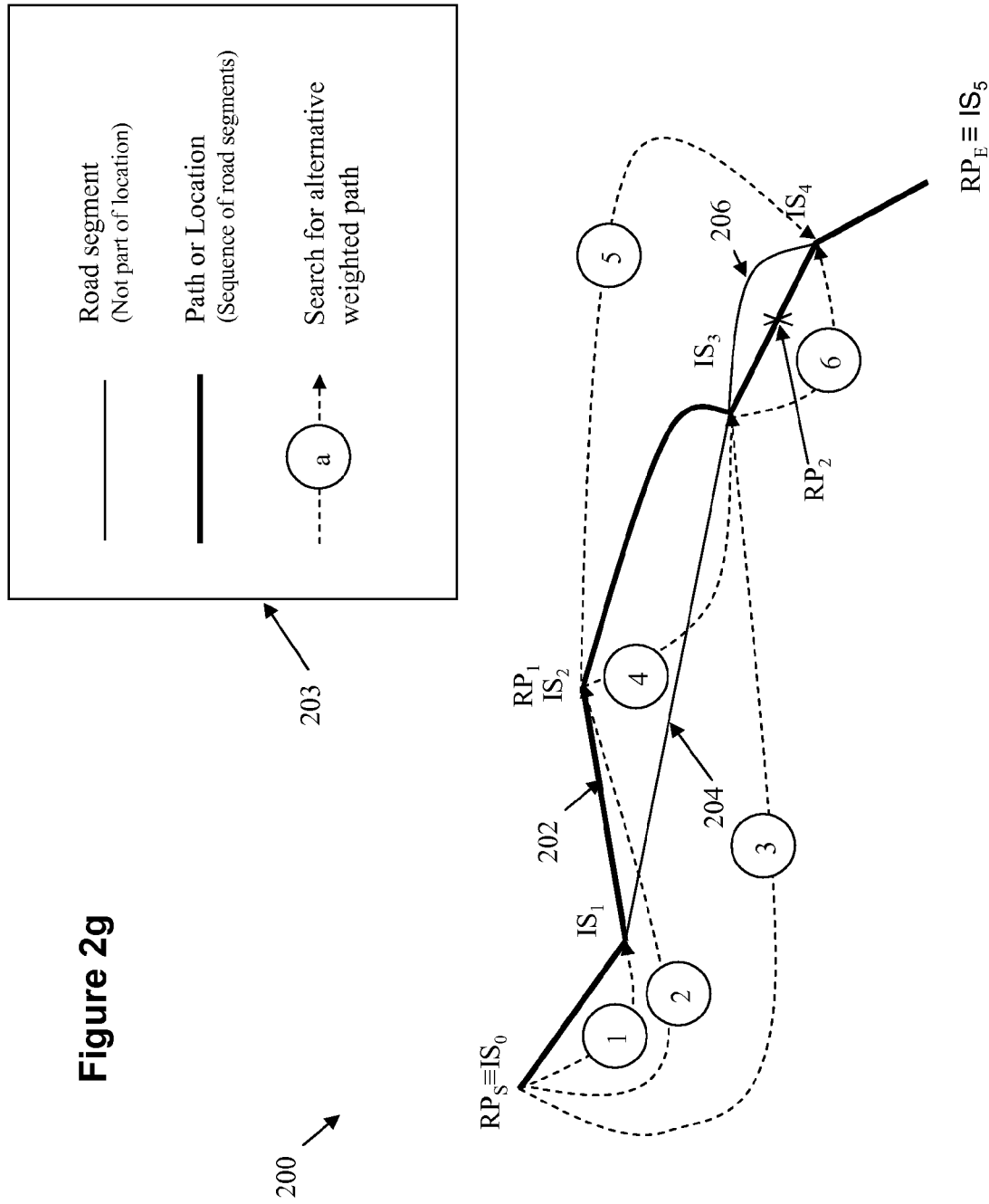

Next, as shown in FIG. 2f, the encoder conducts search (5) between $IS_2$ ($RP_1$) and the next intersection ($IS_4$) for an alternate weighted path between $RP_1$ and $IS_4$. In this case, an alternate weighted path is found, that is, $RP_1 \rightarrow IS_3 \rightarrow IS_4$ (using path 206). Because an alternate weighted path is found, a new routing point needs to be placed on the path between $IS_3$ and $IS_4$. As shown in FIG. 2g, search (6) is conducted between $IS_3 \rightarrow IS_4$. As there is an alternate weighted path between $IS_3 \rightarrow IS_4$, $RP_2$ is placed at the mid-point of $IS_3$ and $IS_4$.

Figure 2H:
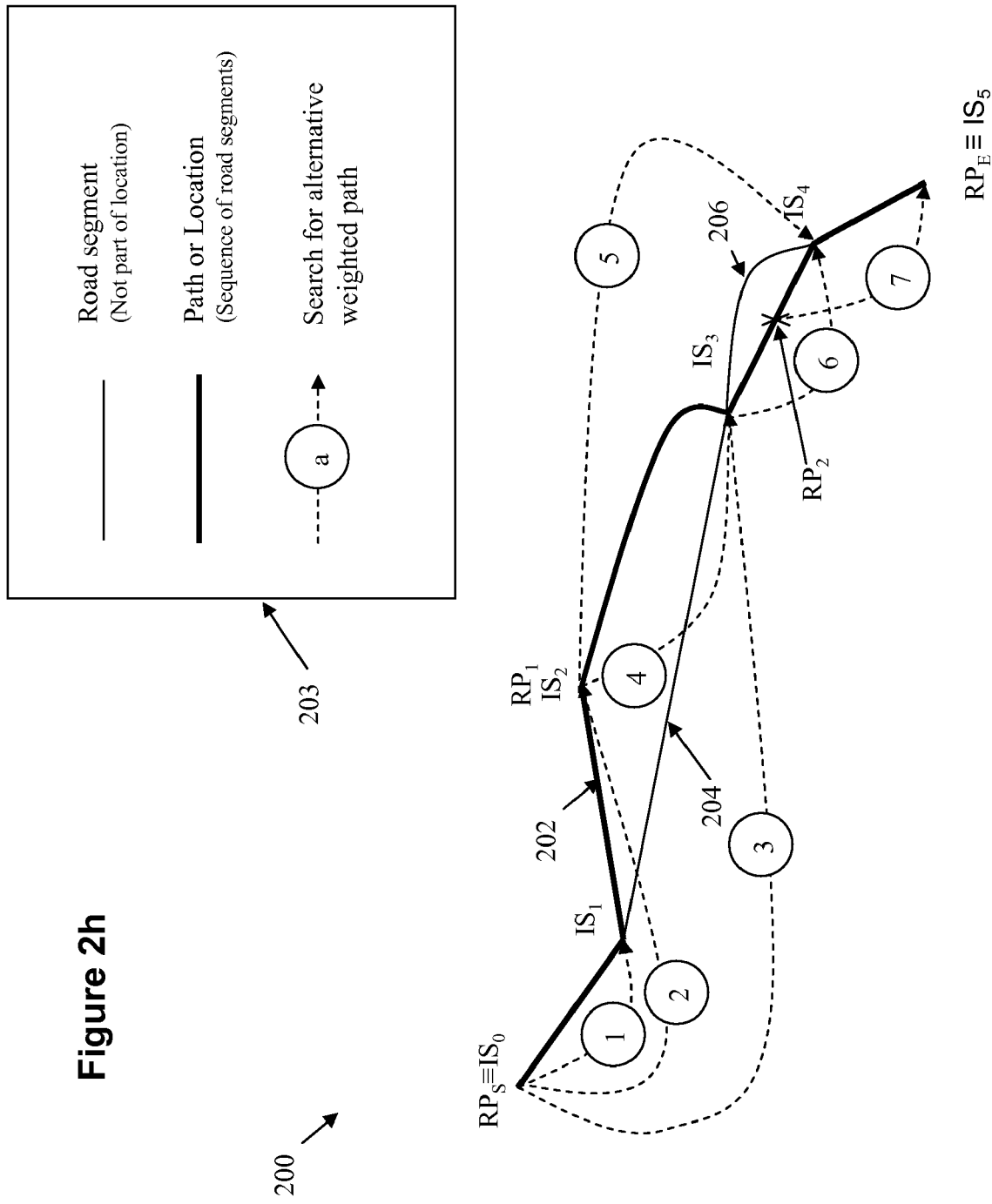

Finally, as shown in FIG. 2h, the encoder conducts search (7) between $RP_2$ and the next intersection $IS_5/RP_E$, or the ending routing point. Since there is no alternate weighted path between $RP_2 \rightarrow RP_E$, the encoding process has been completed. FIG. 2h shows the whole search process.

The encoding process attempts to ensure that there is only one valid way to decode the path since there are no alternate valid paths between consecutive pairs of routing points between the start and end points, inclusive, of the path in the sender map. However, alternate paths may be present in the receiver map; unless it is the same map as the sender, as there may be additional roads, missing roads, etc.

The encoder search process can use the location direction in which the location has been selected to work its way along the road segments in the location in the selected direction. At an intersection, it can generate possible alternate paths by getting all the roads at that intersection and testing each one to see if it should be followed further or whether it should be discarded because the cost limit has been exceeded. For each one that is followed further, all road segments connected to it can be obtained and considered.

The decoder can decode the location in the order of the routing points, finding paths between the first pair, then the second pair and so on. It can find routing point matches by searching within a radius around routing point coordinates and can use bearing information (an attribute of a routing point, depending on driving direction) in deciding on the best match of the possible road segments found and in starting off searches for paths between routing points in the right direction.

When calculating alternate weighted paths at intersections the driving direction need not be used. However the decoder can use driving direction information in deciding which road segments are possible matches for parts of the location.

In one embodiment, the encoder uses:
the selected location—list of road segments ordered by direction of selection, (where a road segment has an intersection at each end).
the coordinates of the start and end of the location—these are the start and end $RP_S$,
the intersections along the location between the start and end $RP_S$—a list of intersections between the location road segments ordered by direction of selection
the ability to get all the road segments connected to an intersection
the functional road class (FC) of a road segment
road segment shape point coordinates The encoder can calculate the various distances such as the length of the road segment (distance from start to end), the distance along a road segment from its start/end to/from a RP that lies on the road segment, the distance along the whole location between the start and end $RP_S$, and can calculate where to place mid-point $RP_S$ on road segments The Agora-C weight factor table can be used to giving the weight factor for each functional road class, Table 5.1, Rule 17.

As discussed above, other Agora-C rules such as rules 10 and 11 can require additional points be added to the transmitted path definition. Rules 10 and 11 of AGORA-C read as follows:

RULE-10 The segment length along the original path of the location between successive location points shall not be exceed by more than 5% or 10 m (whichever is greater) of the great-circle (airline) distance between the successive location points.

Note: The shape of the location hence is restricted to lie within a narrow corridor around the road sections represented in the location.

RULE-11 Each intersection along the location at which the road section signature changes shall be represented by an intersection point. If the last point of the location is an intersection, it constitutes an intersection point, even if the road section signature does not change at that point.

A specification such as the AGORA-C specification, can define the criteria for determining what alternate paths are valid. In one example, an alternate path to a section of a path is valid if the routing calculation cost of the alternate path is less than a function of the cost of the path section. In the AGORA-C specification, the alternate path, to a section of a path, is valid if the cost of the alternate path is less than 1.25 times the cost of the path section. The cost can be determined using distance and weight values.

The added routing points are preferably at intersection points as this provides additional information. In Agora-C some intersection points will be included in the shortened path definition and adding routing point information to an already included point saves space over adding a whole new point. If there is an alternate path to the currently tested section of a path, but there is no alternate path to just the end segment of the currently tested section, then the intersection point at the start of the end segment is selected as a new routing point. If there is an alternate path to the currently tested section and there is an alternate path to the end segment, then a mid-point is selected as the new routing point.

Appendix I shows pseudocode for an exemplary encode search algorithm.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX I

Encode Search Algorithm, includes placement of RPs

Assume have location made up of a sequence of n road segments. Each road segment has a junction (intersection) at each end. The first and last points of the location are RP's: $RP_S$ and $RP_E$ and are also denoted by $J_0$ and $J_n$, respectively.

$RP_S$                                                         $RP_E$ $J_0$--------$J_1$--------------$J_2$---------------$J_3$............$J_n$

NOTE: isPathBetween($J_s$, $J_e$) search excludes road segment from $J_{e-1}$ to $J_e$ (resultFlag, $J_1$, $J_2$) search ($J_s$, $J_e$, skip) {
        if skip, set i so $J_i$ is $2^{nd}$ junction after $J_s$ else $1^{st}$ junction after
        while (i<=e) { /* i.e. $J_i$ is within the location */
            if (isPathBetween($J_s$, $J_i$) with cost<1.25*costOfPath($J_s$, $J_i$) {

APPENDIX I-continued

Encode Search Algorithm, includes placement of RPs

```
            /* new RP is required [J_{i-1}, J_i] */
            return (needNewRP, J_{i-1}, J_i)
        }
        else {
            i++;
        }
    }
    return Done /* reached end of location */
}
RP insertRP (J_s, J_e) { /* Note these are adjacent junctions */
    if (J_s is already a RP) {
        newRP = insert at mid-point of J_s, J_e
    }
    else {
        if (isPathBetween (J_s, J_e)with cost < 1.25*costOfPath(J_s, J_e) ) {
            newRP = insert at mid-point of J_s, J_e
        }
        else {
            J_s becomes an RP
            newRP = J_s
        }
    }
    return newRP
}
Main Loop:
res = NotDone
RP_s = RP_S
while (res != Done) {
    (res, J_1, J_2) = search (RP_s, RP_E, (res==NeedNewRP) )
    if (res == needNewRP) {
        RP_s = insertRP(J_1, J_2)
    }
}
```

What is claimed is:

1. A mapping system comprising a receiver and a sender arranged to communicate with one another via a communication link, wherein the sender includes an initial path definition defining a path, the initial path definition comprising: a starting point, a list of intersection points, and an end point;

the sender further includes an encoder having means for encoding the initial path definition to a shortened path definition;

the receiver includes a decoder having means for decoding the shortened path definition and means for reconstructing the initial path definition;

and wherein the encoder further comprises:

means for checking whether there is a valid alternate path between the starting point and successive points of the initial path definition, wherein the valid alternate path does not contain the part of the path between the last two points included in a check;

means for completing the process of checking the initial path definition if there is no valid alternate path, and the means for checking has checked the path to the end point, means for eliminating the valid alternate path by adding a new routing point to the initial path definition, if a valid alternate path has been determined by the means for checking, means for repeatedly checking whether there is a valid alternate path between a newly added routing point and successive points of the initial path definition, wherein the valid alternate path does not contain the part of the path between the last two points included in a check, and means for completing the process of checking the initial path definition by defining the final shortened path definition as a starting point, a sequence of routing points, and an ending point of the path.

2. The mapping system of claim 1, wherein the part of the path between the last two points included in the process of checking is the last segment for that check of a valid alternate path between the starting point and one of the successive points and wherein the encoder further comprises means for placing a routing point, if required, in the last segment.

3. The mapping system of claim 2, wherein the encoder further comprises means for determining where to place the routing point on the last segment by an additional search over just the last segment.

4. The mapping system of claim 1, wherein the sender further comprises means for producing a transmitted path definition by using the shortened path definition.

5. The mapping system of claim 4, wherein the receiver further comprises means for receiving the transmitted path definition.

6. The mapping system of claim 5, whereby the decoder comprises means for decoding the transmitted path definition against the same map or different map by same vendor or by different vendor.

7. The mapping system of claim 1, wherein the encoder further comprises means for checking whether there is a valid alternate path between the start and end of a currently checked section of the path.

8. The mapping system of claim 7, wherein:

the encoder further comprises means for validating the currently checked section by setting the end of the section to the next point of the initial path definition, thus adding a new end segment from the previous section end to the updated section end, if there is no valid alternate path.

9. The mapping system of claim 7, wherein the encoder further comprises:

means for
adding a new routing point within the end segment of the currently checked section to the shortened path definition, and
means for updating the currently checked section by setting the start to the new routing point, and setting the end to the next point of the initial path definition; if there is a valid alternate path.

10. The mapping system of claim 1, wherein a specification determines what alternate paths are valid.

11. The mapping system of claim 10, wherein the specification is the AGORA-C specification.

12. A mapping system comprising a sender and a receiver arranged to communicate with one another via a communication link, wherein
the sender includes an initial path definition defining a path, the initial path definition comprising: a starting point, a list of intersection points, and an end point,
the sender further includes an encoder having means for encoding the initial path definition to a shortened path definition;
the receiver includes a decoder having means for decoding the shortened path definition and means for reconstructing the initial path definition;
and wherein the encoder further comprises:
means for checking whether there is a valid alternate path between the start and end of a currently checked section of the path which does not contain the end segment, the end segment being the part of the path between the last two points of the currently checked section,
means for updating the currently checked section by setting the end of the section to the next point of the initial path definition, thus adding a new end segment from the previous section end to the updated section end, if there is no valid alternate path,
means for adding a new routing point within the end segment of the currently checked section to the shortened path definition, and updating the currently checked section by setting the start to the new routing point, and setting the end to the next point of the initial path definition, if there is a valid alternate path,
means for repeatedly checking whether there is a valid alternate path between the start and end of a currently checked section of the path which does not contain the end segment, the end segment being the part of the path between the last two points of the currently checked section, until the end of the currently checked section is the end point of the path and the currently checked section has no valid alternate path, and
wherein the shortened path definition includes the start point, and the end point of the path and any routing point added.

13. The mapping system of claim 12, wherein the sender further includes means for producing a transmitted path definition by using the shortened path definition.

14. The mapping system of claim 13, wherein the receiver further includes means for receiving the transmitted path definition.

15. The mapping system of claim 14, whereby the decoder comprises means for decoding the transmitted path definition against the same map or different map by same vendor or by different vendor.

16. The mapping system of claim 12, wherein the encoder further comprises means for excluding the end segment of the section of the path currently being checked from being part of an alternate path, while checking for a valid alternate path.

17. The mapping system of claim 12, wherein initially the currently checked section and the end segment are the same.

18. The mapping system of claim 12, wherein a specification defines what alternate paths are valid.

19. The mapping system of claim 18, wherein the specification is the AGORA-C specification.

20. The mapping system of claim 12, wherein an alternate path is valid if the cost of the alternate path is less than a function of the cost of the current section.

21. The mapping system of claim 20, wherein the encoder further comprises means for determining the cost using distance and weight values.

22. The mapping system of claim 12, wherein the encoder further comprises means for selecting the intersection point at the start of the end segment as the new routing point, if there is an alternate path to the currently checked section, but there is no valid alternate path to the end segment of the currently checked section.

23. The mapping system of claim 12, wherein the encoder further comprises means for selecting the mid-point of the end segment as the new routing point, if there is an alternate path to the currently checked section, and there is an alternate path to the end segment of the currently checked section.

24. The mapping system of claim 12, wherein the first checked section is a segment from the start point of the path to the first intersection point of the path and is also the end segment.

25. A method for Agora-C encoding for determining routing point (RP) placement on a location, where the location comprises one or more consecutive connected road elements, each of the one or more road elements having two ends (i, i+1), each road element end terminating at a intersection (ISi, ISi+1), the location starting at starting routing point (RPS), also denoted by IS0, and ending at ending routing point (RPE), also denoted by ISE, such that E represents the total number of road elements of the location, the method comprising an encoder within a sender of a mapping system performing the steps of:
a. setting x=0 and y=x+1
b. determining whether y<=E;
c. if not, skipping to step e
d. if so, determining whether there are any alternate weighted paths between RP1 and ISy other than the location path between RPx and ISy;
if so,
i.1. placing RP(x+1) along the location path between IS(y−1) and ISy;
i.2. incrementing x;
i.3. incrementing y;
i.4. returning to step b; or
if not,
ii.1. incrementing y;
ii.2. returning to step b;
e. ending the routing point placement method.

26. The method of claim 25 where an alternate weighted path between RPx and ISy is less than (<) 1.25 times (*) the weighted location path between RPx and ISy.

27. The method of claim 25 further including, after step d.i.1, the steps of:
d.i.1.i. determining whether there is an alternate weighted path between IS(y−1) and ISy; and
d.i.1.ii. if so, placing RP(x+1) along the location path between IS(y−1) and ISy but not on either IS(y−1) and ISy; or
d.i.1.iii. if not, determining if RPx is at IS(y−1) and if so, placing RP(x+1) along the location path between IS(y−

1) and ISy, but not on either IS(y−1) or ISy; or if not, placing RP(x+1) on IS(y−1).

28. A method of encoding a shortened path definition of a path from an initial path definition comprising a starting point, a list of intersection points, and an end point, the method comprising an encoder within a sender of a mapping system performing the steps of:
  checking whether there is a valid alternate path between the starting point and successive points of the initial path definition, wherein the valid alternate path does not contain the part of the path between the last two points included in a check;
  completing the process of checking the initial path definition if there is no valid alternate path and the path has been checked to the end point,
  eliminating the valid alternate path by adding a new routing point to the initial path definition, if a valid alternate path has been determined during the checking,
  repeatedly checking whether there is a valid alternate path between a newly added routing point and successive points of the initial path definition, wherein the valid alternate path does not contain the part of the path between the last two points included in a check, and
  completing the process of checking the initial path definition by defining the final shortened path definition as a the starting point, a sequence of routing points, and an ending point of the path.

29. A sender of a mapping system arranged to communicate with a receiver via a communication link, wherein the sender includes a processor configured to:
  encode an initial path definition defining a path to a shortened path definition, the initial path definition comprising: a starting point, a list of intersection points, and an end point;
  check whether there is a valid alternate path between the starting point and successive points of the initial path definition, wherein the valid alternate path does not contain the part of the path between the last two points included in a check;
  complete the process of checking the initial path definition if there is no valid alternate path, and the path has been checked to the end point,
  eliminate the valid alternate path by adding a new routing point to the initial path definition, if a valid alternate path has been determined by the check,
  repeatedly check whether there is a valid alternate path between a newly added routing point and successive points of the initial path definition, wherein the valid alternate path does not contain the part of the path between the last two points included in a check, and
  complete the process of checking the initial path definition by defining the final shortened path definition as a starting point, a sequence of routing points, and an ending point of the path.

* * * * *